United States Patent [19]
Niwa et al.

[11] Patent Number: 5,267,486
[45] Date of Patent: Dec. 7, 1993

[54] STEERING WHEEL WITH PAD

[75] Inventors: Minoru Niwa, Ichinomiya; Naoyuki Kumagai; Kouichi Kaga, both of Aichi, all of Japan

[73] Assignee: Toyoda Gosei Co., Ltd., Nishikasugai, Japan

[21] Appl. No.: 34,214

[22] Filed: Mar. 19, 1993

Related U.S. Application Data

[63] Continuation of Ser. No. 620,475, Nov. 30, 1990, abandoned.

[30] Foreign Application Priority Data

Nov. 30, 1989 [JP] Japan .................. 1-312063

[51] Int. Cl.⁵ .................. A62D 1/04; B60R 21/05
[52] U.S. Cl. .................. 74/552; 74/558; 280/750; 280/731
[58] Field of Search .................. 74/552, 558; 280/731, 280/743, 750

[56] References Cited

U.S. PATENT DOCUMENTS

| 3,773,352 | 11/1973 | Radke | 280/731 |
|---|---|---|---|
| 3,895,823 | 7/1975 | Stephenson | 74/552 |
| 3,945,665 | 3/1976 | Tsutsumi et al. | 280/731 |
| 4,325,568 | 4/1982 | Clark et al. | 74/552 |
| 4,368,454 | 1/1983 | Pilatzki | 74/552 |
| 4,655,101 | 4/1987 | Endo et al. | 74/552 |
| 4,884,823 | 12/1989 | Honda | 74/552 |
| 4,938,503 | 7/1990 | Muraoka et al. | 280/731 |

FOREIGN PATENT DOCUMENTS

| 2431686 | 1/1975 | Fed. Rep. of Germany | 280/731 |
|---|---|---|---|
| 0261751 | 12/1985 | Japan | 280/750 |
| 3-52218 | 9/1991 | Japan . | |

Primary Examiner—Carl D. Friedman
Assistant Examiner—Winnie Yip
Attorney, Agent, or Firm—Cushman, Darby & Cushman

[57] ABSTRACT

A steering wheel having a body including a boss, a ringlike rim and a plurality of inclined spokes connecting the boss and the rim is characterized in that a pad which may serve as an air bag unit is disposed within the body so as to extend from the boss to the upper portion of the spokes. The pad is mounted with a plurality of brackets extending between the pad and the spokes. Each of the brackets is fastened to an inclined spoke on one hand and, on the other, has a through-hole for receiving a support projecting from the boss or a respective spoke for holding the pad in position and regulating the lateral movement of the pad.

20 Claims, 5 Drawing Sheets

STEERING WHEEL WITH PAD

This is a continuation of application Ser. No. 07/620,475, filed on Nov. 30, 1990, which was abandoned upon the filing hereof.

BACKGROUND OF THE INVENTION

1. Field of the Invention

The present invention relates to an automobile steering wheel. More particularly, this invention relates to a steering wheel comprising a body, a ringlike rim and a plurality of spokes connecting the former two and provided with a pad located between the boss of the body of the wheel and the upper portion of the spokes. The invention also relates to a steering wheel of the above type in which the pad is fixed to the inclined portion of each of the spokes arranged between the boss and the ringlike rim of the body of the wheel by means of attachment such as screws.

2. Description of the Prior Art

The steering wheel in FIG. 1 has previously been disclosed in U.S. Pat. No. 3,895,823. As shown, steering wheel WO comprises a body 1, a boss 2, a plurality of spokes 3, a ringlike rim 4 and a pad 5. The pad 5 is arranged between the boss 2 of the steering wheel body 1 and the upper portion of the spokes 3. The boss 2 is located near the center of the rim 4, and the spokes 3 extend obliquely and upwardly of the boss 2 so as to connect the boss 2 and the rim 4.

The pad 5 is extended on both sides with brackets 6. Each of the brackets 6 is fixed to a respective spoke 3 by a bolt 7 and nut 6a, each bolt being in a through-hole 3a drilled through a respective spoke 3 at a predetermined position.

With the above arrangement, the pad 5 is attached to the spokes 3 of the steering wheel body 1. In this case, the bolt 7 is inserted through the hole 3a of each obliquely extending spoke 3 so as to extend normal to the spoke length. The bolting is done in this manner to prevent physical interferences with peripheral devices such as the surrounding column cover and instrument panel which might occur because pad 5 is mounted in the wheel body 1 after the attachment of the wheel body to the automobile.

The above manner of mounting pad 5 has had certain problems. One such problem occurs when pad 5 is utilized as an air bag unit and is thus provided with an inflatable air bag. On such an occasion, the overall weight of the pad 5 becomes large. Therefore, because the spoke 3 is inclined, when an attempt is made to attach the bracket 6 to the spoke 3 at a predetermined position, much more time is required to align the nut 6a with the through-hole 3a of the spoke 3. The result is an increase in the manpower required for bolting.

Furthermore, as the spoke 3 having the bracket 6 attached thereto is inclined, bracket 6 tends to move along the inclined surface of the spoke 3. Such movement of the bracket 6 naturally takes place because the diameter of the through-hole 3a is made somewhat larger than the diameter of the bolt 7 so as to facilitate insertion of the bolt 7 into the through-hole 3. Once the pad 5 is bolted to the spoke 3 after the bracket 6 has shifted out of position along the spoke 3 as described above, then the vertical position of the pad 5 with respect to the steering wheel body 1 will deviate from the predetermined one; in that case, rearrangement of the pad 5 becomes necessary.

SUMMARY OF THE INVENTION

One objective of the present invention is to provide an automobile steering wheel which enables a pad mounting bracket to be easily arranged at a predetermined position on each of the inclined spokes regardless of the pad's weight and which facilitates the pad mounting operation.

A second objective of the present invention is to provide an automobile steering wheel which allows a pad to be placed at a predetermined vertical position with respect to the body of the steering wheel with improved accuracy after the pad is mounted.

The above objectives are achieved by an automobile steering wheel comprising: a steering wheel body including an annular rim, a boss located substantially near the center of the rim, a plurality of inclined spokes to connect the boss with the rim, a pad extending from the boss to the upper portion of the spokes, a plurality of brackets mounted on the spokes by means of attachment and to the pad, and a plurality of support projections coming into engagement with the lower surface of the pad brackets when the pad is mounted by the means of attachment.

The steering wheel according to the present invention solves the weight problem discussed earlier as follows: when the lower surface of the pad is brought into engagement with the support projections formed with the body of the steering wheel at the time of mounting the pad with the means of attachment, the brackets extending from the pad can be placed in position on the inclined spokes. Therefore, even when the weight of the pad is increased, it is easy to mount the pad by the means of attachment.

Thus, the support projections bear against the lower surface of the pad brackets during mounting and even after mounting the pad so that the bracket is prevented from moving along the inclined surfaces of the spokes. As a result, even if the pad is heavy, the dimensional accuracy of the vertical and horizontal mounting of the pad in the steering wheel body is improved, and no remounting of the pad is required.

Accordingly, when the steering wheel described in the present invention is equipped with a pad, the pad brackets can be placed in position on the inclined spokes even if the pad is heavy. Thus, the pad can be easily mounted with the means of attachment. Further, it is possible with the steering wheel of the present invention to improve the dimensional accuracy of the vertical position of the pad with respect to the wheel body after the pad has been mounted.

Another object is to fix the horizontal position of the pad by locating pins or necks extending from the projecting supports.

A further object of the invention is to provide a method for assembling a steering wheel pad assembly to a steering wheel by first setting the pad assembly with attached brackets on steering wheel body supports to position the pad assembly at the correct height and to position the bracket ends correctly adjacent to bolt holes in the spokes for easier bolting.

Still further, the invention comprehends setting the brackets over pins or necks protruding from the supports to prevent lateral movement of the pad assembly during and after the brackets are fastened to the spokes.

Other objects and advantages will become apparent to those of ordinary skill in the art upon understanding the following disclosure in view of the drawings in which:

DETAILED DESCRIPTION OF THE PRESENTLY PREFERRED EXEMPLARY EMBODIMENTS

Figure 1:
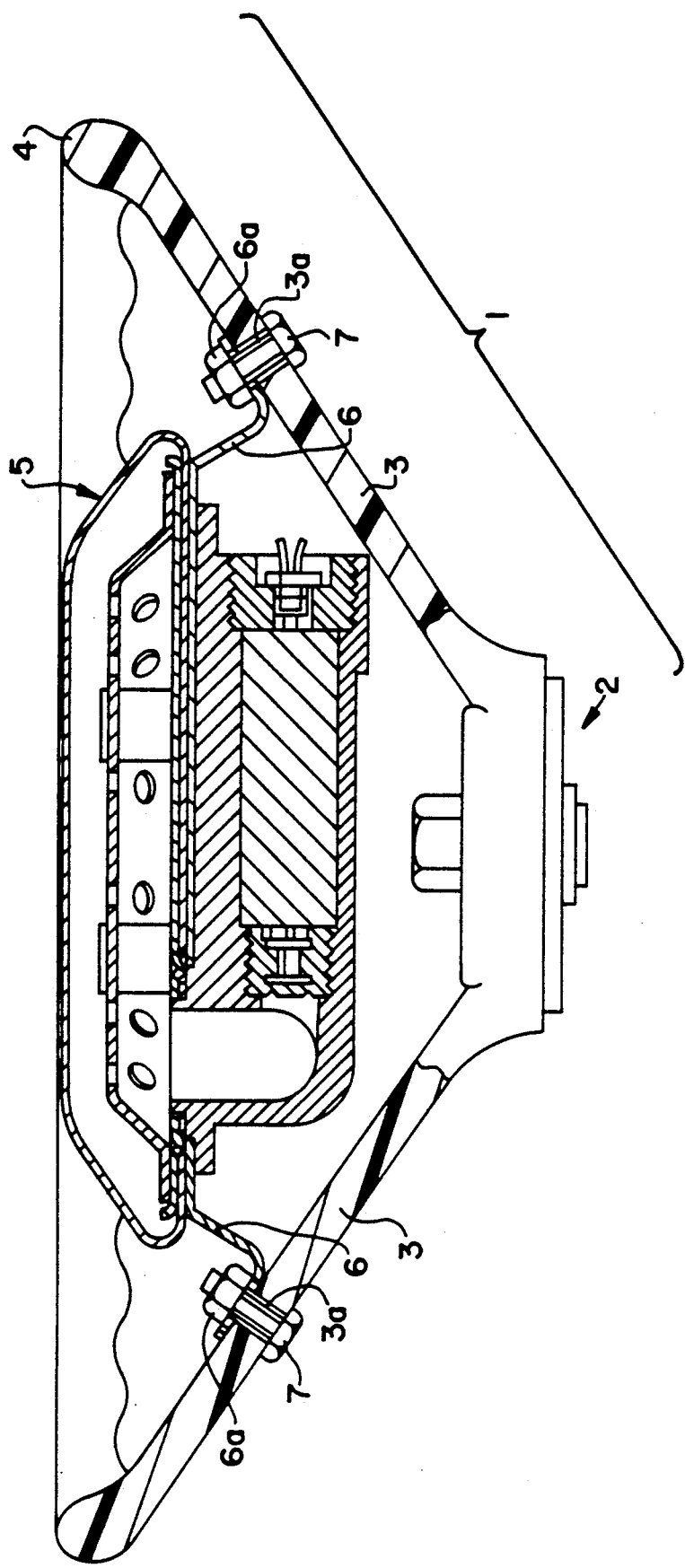
FIG. 1 is a cross-sectional view of a conventional steering wheel.
Figure 2:
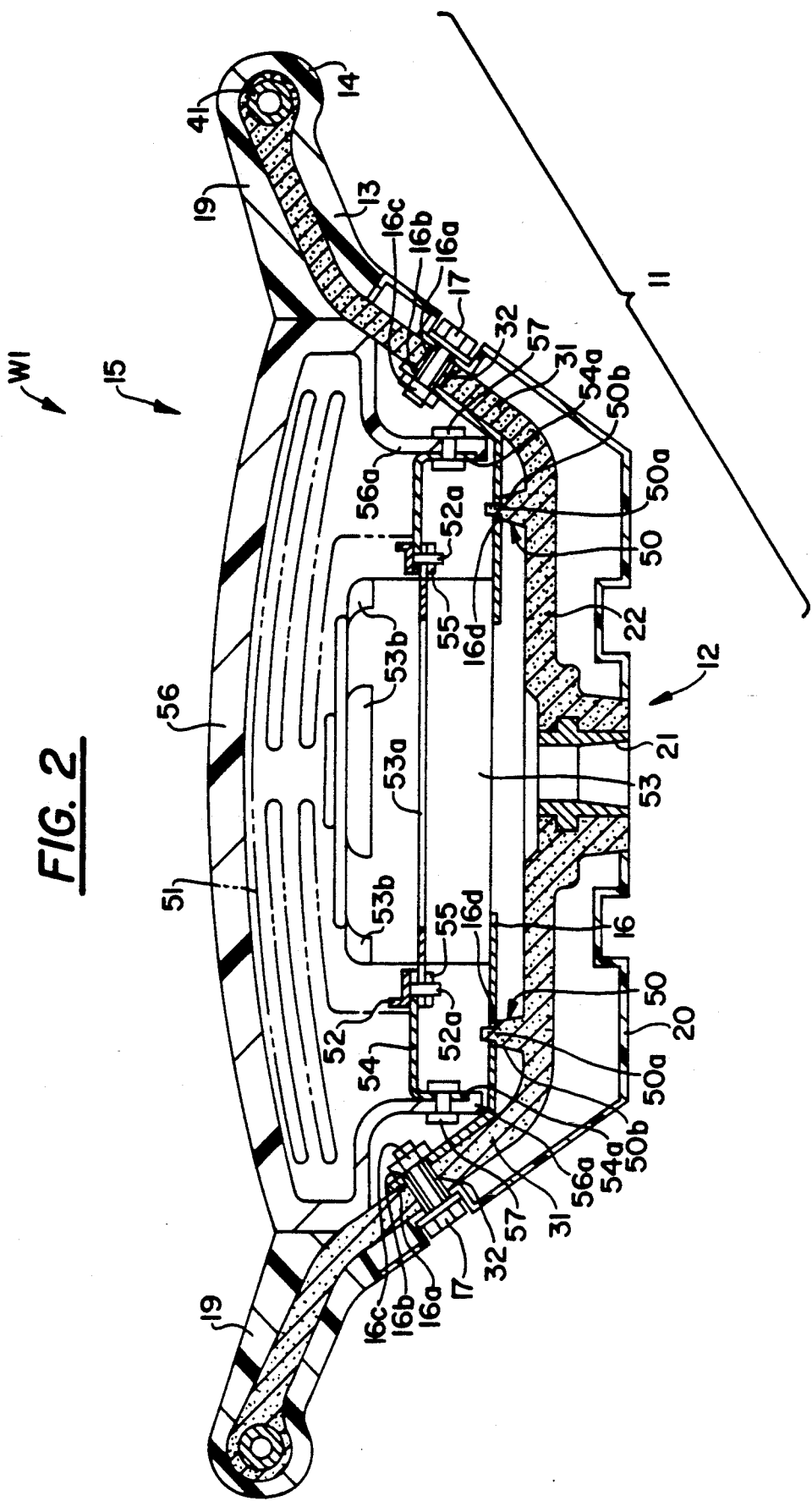
FIG. 2 is a cross-sectional view of a steering wheel as one embodiment of the invention, with the view being taken along the line 2—2 of FIG. 3.
Figure 3:
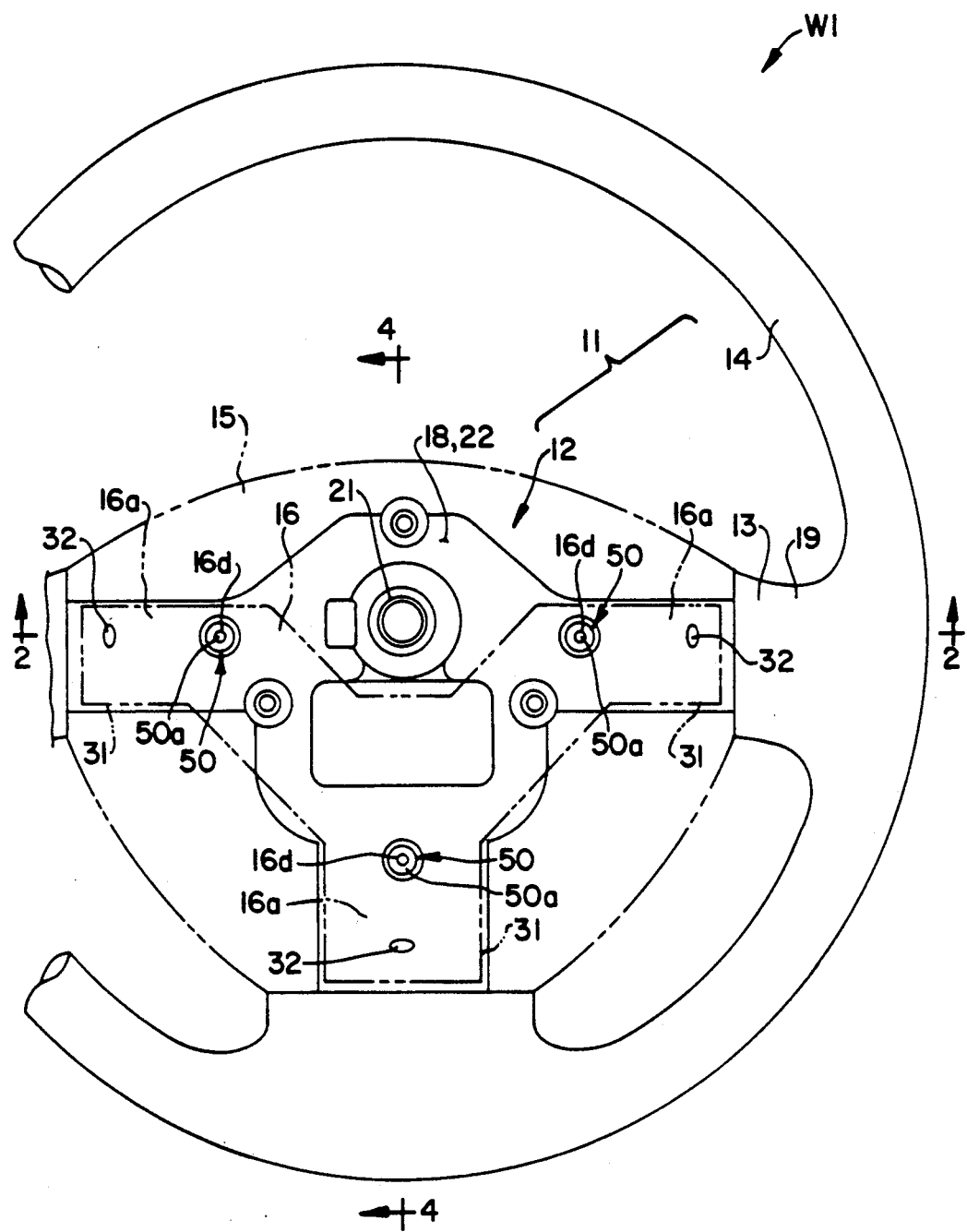
FIG. 3 is a plan view of the body of the steering wheel shown in FIG. 2.
Figure 4:
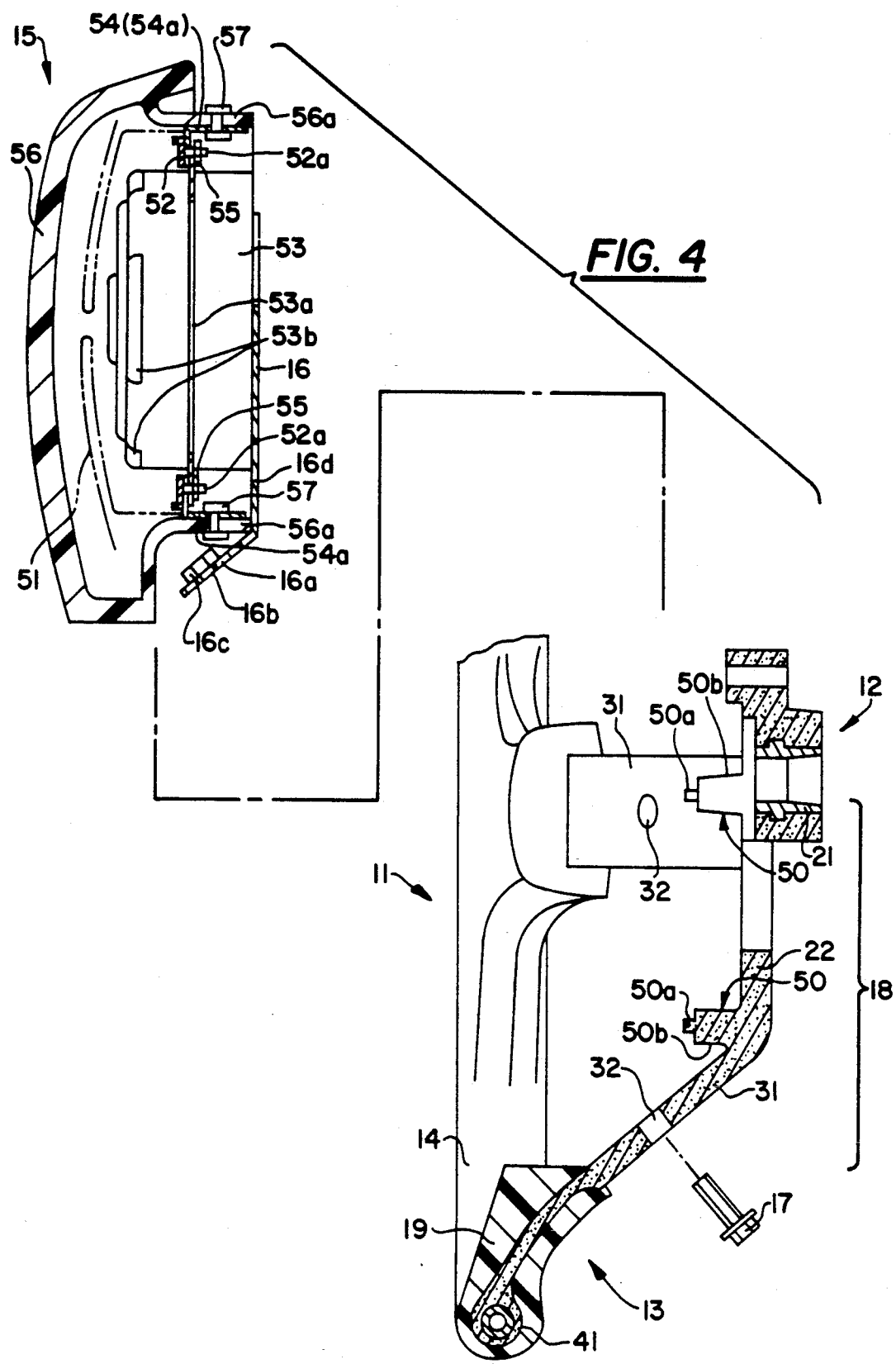
FIG. 4 is a cross-sectional view taken along the line 4—4 of FIG. 3, showing the steering wheel and pad separated before mounting them together.

As shown in FIGS. 2-4, a steering wheel W1 comprises a body 11 including a boss 12 located substantially at the center of the body 11, and a ringlike rim 14, three spokes 13 connecting together a boss 12 and the rim 14. A pad 15 extends from the boss 12 to the upper portion of the spokes 13 and sets in the cavity formed by the boss, spokes and a plane of the rim.

In the instant embodiment, the pad 15 (which is an assembly) serves as an air bag unit including an air bag 51, a cover 56, and inflator 53 and a bag holder 54. Normally, the air bag 51 is folded and uninflated, but inflates on a predetermined occasion. The cover 56 encloses the folded bag 51. When the bag 51 inflates on the predetermined occasion, the cover 56 breaks. The inflator 53 supplies gas into the folded bag 51, and the bag holder 54 couples together the air bag 51, the cover 56 and the inflator 53. The inflator 53 which is located above the flange 53a has a gas ejection port 53b at the upper portion thereof. The gas ejection port 53b is inserted from below into the bag holder 54 through the bag holder's central hole.

The connection of the air bag 51 and the inflator 53 to the bag holder 54 is made in the following manner. An annular retainer 52 is mounted on the upper surface of the peripheral edge of an opening of the air bag 51 (the inner peripheral side of the peripheral edge). The retainer 52 is attached with a plurality of downwardly extending bolts 52a which extend through the peripheral edge of the opening of the air bag 51, the bag holder 54 and the flange 53a of the inflator 53, and which are fastened to the lower surface of the flange 53a with nuts 55. As a result, the air bag 51 and the inflator 53 are connected to the bag holder 54. Further, the cover 56 and the holder 54 have their peripheral side walls 56a and 54a connected together with a plurality of blind rivets 57. These rivets 57 are inserted from only one side (i.e., from the outer peripheral surface of the side wall 56) thereby connecting both side walls 54a and 56a.

Further, the pad 15 is provided with a bracket 16 for mounting the pad 15 in the body 11 of the steering wheel. The bracket 16 is made of a metal plate and is affixed to the lower part of the inflator 53. In addition, the bracket 16 extends radially outwardly and is provided with three upwardly bent tongues 16a extending parallel along an inclined metallic core 31 of each of the spokes 13. The tongue 16a has a through-hole 16b at a position corresponding to a through-hole 32 drilled in the metallic core 31 of each spoke 13. Further, at the peripheral edge of the through-hole 16b in the upper surface of the bracket 16 there is fixed a nut 16c.

The steering wheel body 11 is reinforced with a metallic core 18 extending through to the rim 14, the three connecting spokes 13 and the boss 12. Further, the metallic core 18 is provided with a steel boss 21 to connect to a steering shaft (not shown) at the boss 12 of the wheel body 11, a metallic spoke core 31 extending obliquely and upwardly of the boss plate 22 at each of the spokes 13 and a steel rim core 41 (in the form of a pipe) at the rim 14. The boss plate 22 and each of the spoke metallic cores 31 are molded integral with each other by die casting (preferably of a light aluminum alloy).

The metallic spoke core 31 has the above-mentioned through-holes 32 through which each of the tongues 16a of the bracket 16 extending from the pad 14 is fastened to the spoke core 31 with a bolt 17 and for this purpose, the through-hole 32 is drilled at a position coinciding with the through-hole 16b of the bracket 16.

A coating layer 19 made of a soft synthetic resin covers the steel rim core 41 and the metallic spoke core 31. A lower cover 20 is fixed to the metallic spoke core 31 with the bolt 17 so as to cover the lower part of the boss 12 and that of each of the spokes 13.

In this embodiment, the wheel body 11 has upwardly projecting supports 50 at three points on the boss plate 22 of the metallic wheel core 18 in the vicinity of the spoke core 31. Each of the projecting supports 50 has a round neck section 50a extending upwardly from the shoulder of the body 50b of the support. The height of the shoulders of the support bodies 50b is determined so that when the necks 50a of the supports 50 passes through holes 16d of the bracket 16, and the lower surface of the bracket comes to rest on the shoulders of the support bodies 50b, the tongues 16a of brackets 16 abut the metallic spoke cores 31. Further, the positional relationship between the neck sections 50a and the respective through-holes 16d is such that when a neck section 50a is inserted into the respective through-hole 16d, the respective through-hole 16b of the tongue 16a coincides with the through-hole 32 of the metallic spoke core 31.

Next, the manner of mounting the pad 15 in the steering wheel body 11 is described.

First, the neck sections 50a of the projecting supports 50 are inserted into the through-holes 16d of brackets 16 until the lower surface of the brackets 16 abuts the shoulders of the support bodies 50b. This results in tongues 16a coming into contact with the respective inclined spoke core 31, with the through-hole 16b coinciding with the through-hole 32 of the spoke core 31. Consequently, the pad is arranged in position with ease irrespective of whether the pad 15 is heavier than usual and/or serves as an air bag unit.

Next, the bolt 17 is inserted into the through-hole 32 from below through the edge of the lower cover 20. Bolt 17 is screwed into the nut 16c through holes 32 and 16b. As a result, the pad 15 can be mounted in the wheel body 11 in a simple manner.

Since the shoulders of support bodies 50b are in contact with the lower surfaces of brackets 16, the bracket tongues 16a are prevented from moving along the inclined spoke cores 31.

Thus, even when the pad 15 is heavy in weight, the dimensional accuracy of the position of the pad with respect to the wheel body 11 after the pad has been vertically mounted is improved without the necessity of remounting the pad.

Because each of the projecting supports 50 has the its neck section 50a inserted into the through-hole 16d of the bracket 16 during installation of the pad 15 in the wheel body 11, the horizontal positioning of the pad (in a direction parallel to the rim forming plane) can be performed with ease. However, the formation of the neck section 50a is not always essential and it is of course possible to omit it if the above point can be disregarded. That is, the neck sections 50a can be eliminated if the resting of brackets 16 on top of support bodies 50b (without neck sections 50a) allows ready aligning of tongue holes 16d in the brackets and bolt holes 32 in the spokes.

Also, the projecting support 50 is formed integrally with the boss plate 22 of the metallic wheel core 18, which is molded by die-casting. Therefore, the projecting support 50 can easily be formed simultaneously with the manufacture of the core 18 if such convenience is needed. If such convenience is not needed, then the projecting support 50 may be separately fixed to the core 18.

Figure 5:
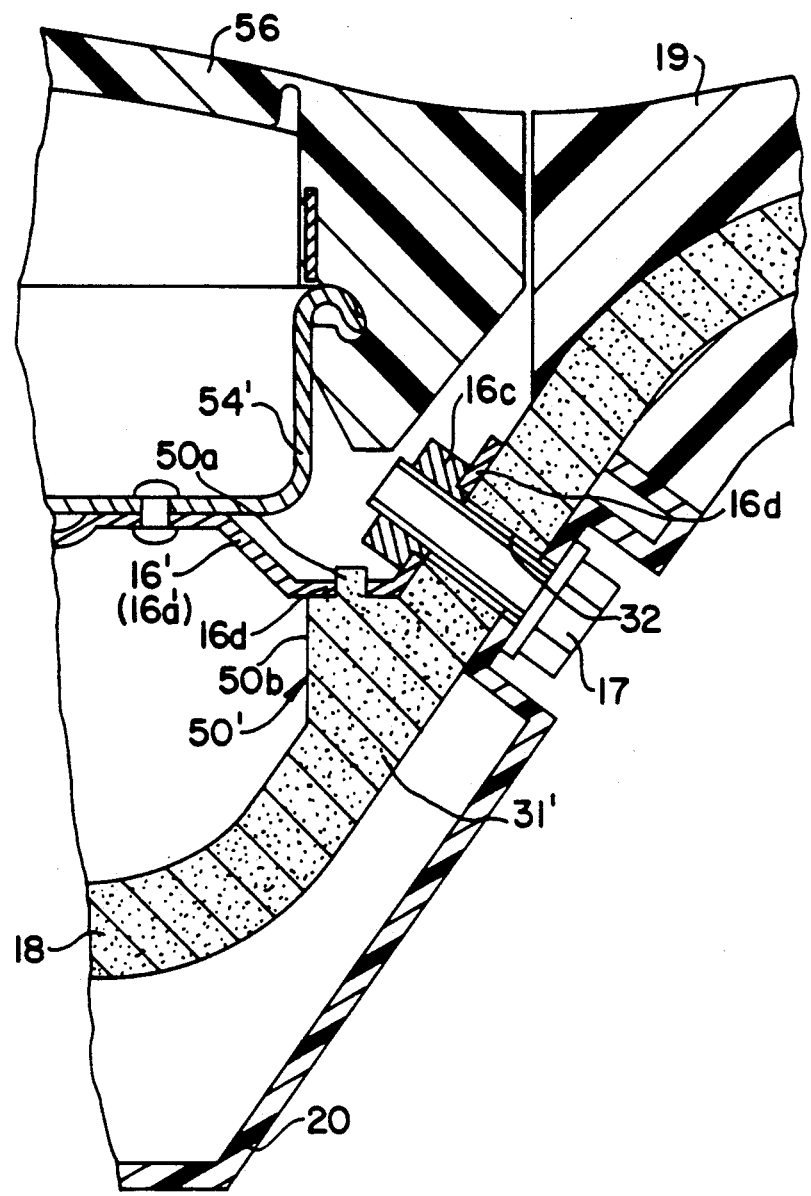
FIG. 5 is a partial cross-sectional view of the steering wheel of another embodiment of the present invention.

An additional embodiment of the present invention is shown in FIG. 5, wherein like parts are designated by like reference numerals. The projecting support 50' of this embodiment is formed on each of the metallic spoke cores 31' of the metallic wheel core 18, unlike the FIGS. 2-4 projecting support 50, which is formed on the boss plate 22.

In the embodiment described by FIGS. 2-4, the bracket 16 is fixed to the lower part of the inflator 52. However, for the second embodiment as described in FIG. 5, the corresponding bracket 16' may be fixed to the bag holder 54' which is inverted relative to the bag holders 54 in FIGS. 2-4. In the FIG. 5 embodiment, bracket tongues 16a' rest on the shoulders of the support bodies 50b', and necks 50a provide the same secure positioning function as in FIGS. 2-4, preventing tongues 16a from moving even when the pad includes a heavy air bag.

It should be noted that the projecting support 50 or 50' is not necessarily formed to project directly from the boss plate 22 or the metallic spoke core 31 of the metallic wheel core 18. That is, a coating layer consisting of a hard synthetic resin material may be formed on the metallic spoke core 31 and then a projecting support may be formed thereon, or a raised portion partly extending upwardly of the boss plate 22 or the metallic spoke core 31 may be formed on the lower cover 20 and a projecting support may be formed at that portion only if such projection can support the pad 15. In any case, the supports project either directly or indirectly from the spoke cores 31 or the boss plate 22.

Additionally, in any embodiment, the role of the support necks and respective through-holes can be reversed whereby the support bodies would have holes instead of necks and the brackets would have locating pins or the like which insert into the respective holes and the brackets come to rest on the shoulders of the support bodies.

The foregoing description and drawings describe two embodiments, but those ordinarily skilled in the art upon appreciating this invention will become aware of further variations and modifications. Therefore, the disclosed embodiments are not to be considered limitative since the scope of this invention is determined by the following claims.

What is claimed is:
1. A steering wheel comprising:
   a body including a ringlike rim, a boss disposed at substantially a center of the rim, and a plurality of spokes extending at an angle relative to a plane of the rim for connecting the boss and the rim to form a cavity between said plane and boss;
   a pad;
   a plurality of brackets for mounting the pad in said cavity on said spokes;
   means for fastening said brackets to said spokes; and
   a plurality of locating supports projecting from said body toward said plane for cooperating with said brackets to support and correctly position, and to maintain the correct position of said pad both during and after the fastening of said brackets to said spokes by said fastening means,
   a portion of each said bracket being inclined at said angle with respect to said plane so that said portion is parallel to a respective spoke, said fastening means being disposed substantially perpendicular to said inclined bracket and said spokes, said supports bearing against said brackets to prevent said brackets from moving along inclined surfaces of said spokes, said boss including a boss plate and said supports projecting from said boss plate.

2. A steering wheel according to claim 1, wherein said supports project from said spokes.

3. A steering wheel according to claim 1, wherein each of said projecting supports has a shoulder surface parallel to said plane so that said projecting support shoulder cooperates with a lower surface of a respective said bracket.

4. A steering wheel according to claim 1, wherein each of said projecting supports has a neck section extending from a respective shoulder and each said bracket has a through-hole for receiving said neck section when said shoulders support said pad through each said bracket.

5. A steering wheel according to claim 1, wherein said boss plate is integrally formed with said body and each said support is integral with said boss plate.

6. A steering wheel according to claim 1, wherein said pad includes an air bag unit provided with an air bag which is normally folded but is capable of opening on a predetermined occasion, a cover member for covering the air bag, a bag holder and an inflator coupled to said holder.

7. A steering wheel according to claim 6, wherein each said bracket is connected to said bag holder.

8. A steering wheel comprising:
   a body including a ringlike rim, a boss disposed at substantially a center of the rim, and a plurality of spokes extending at an angle relative to a plane of the rim for connecting the boss and the rim to form a cavity between said plane and boss;
   a pad;
   a plurality of brackets for mounting the pad in said cavity on said spokes;
   means for fastening said brackets to said spokes; and
   a plurality of locating supports projecting from said body toward said plane for cooperating with said brackets to support and correctly position, and to maintain the correct position of said pad both during and after the fastening of said brackets to said spokes by said fastening means,
   a portion of each said bracket being inclined at said angle with respect to said plane so that said portion is parallel to a respective spoke, said fastening means being disposed substantially perpendicular to said inclined bracket and said spokes, said supports bearing against said brackets to prevent said brackets from moving along inclined surfaces of said spokes, each of said spokes is provided with a metallic spoke core and each of said supports is formed integrally with said spoke core.

9. A steering wheel according to claim 8, wherein each said projecting support has a shoulder surface parallel to said plane so that said projecting support shoulder cooperates with a lower surface of a respective bracket.

10. A steering wheel according to claim 8, wherein each said projecting support has a neck section extending from a respective shoulder and each said bracket has a through-hole for receiving said neck section when said shoulders support said pad through each said bracket.

11. A steering wheel according to claim 8, wherein said boss of said body includes a boss plate integrally formed therewith and each said support is integral with said boss plate.

12. A steering wheel according to claim 8, wherein said pad includes an air bag unit provided with an air bag which is normally folded but is capable of opening on a predetermined occasion, a cover member for covering the air bag, a bag holder and an inflator coupled to said holder.

13. A steering wheel according to claim 12, wherein each said bracket is connected to said bag holder.

14. A steering wheel comprising:
a body including a ringlike rim, a boss disposed substantially at a center of the rim and a plurality of spokes inclined relative to a plane of said rim for connecting the boss and the rim to form a cavity between said plane and boss;
a pad;
a plurality of brackets for mounting the pad in said cavity, said brackets being secured at one end to said pad and having another end extending parallel to respective spokes for securement thereto;
means for securing said brackets to said pad and to said spokes;
a plurality of projections extending from said body in a direction normal to said plane; and
a plurality of receiving means in each said bracket being respectively engaged with said projections, said projections being disposed within said receiving means for regulating movements of said pad in directions parallel to said plane.

15. A steering wheel according to claim 14, wherein each said receiving means is a through-hole in each said bracket.

16. A steering wheel comprising:
a body including a rim, a boss disposed substantially at a center of the rim and a plurality of spokes extending at an angle relative to a plane forming inclined spoke portions passing through said rim for connecting the boss and rim to form a cavity between said boss and plane;
a pad;
a plurality of brackets for mounting the pad in said cavity on said spokes via spoke bolt holes;
each said bracket extending laterally outwardly from said pad and being bent at said angle for a given length to define inclined bracket portions in which is a bracket bolt hole;
a plurality of supports projecting from said body toward said plane for a predetermined distance for positioning said pad at a desired position relative to said plane and for supporting said brackets so that said spoke bolt holes and respective said bracket bolt holes are aligned; and
bolts fastening said inclined spoke portions and said inclined bracket portions together via said bolt holes said bolts being substantially perpendicular to said inclined spoke and bracket portions.

17. A steering wheel as in claim 16, wherein one of said brackets and supports has locating holes and the other has locating pins mating with respective locating holes for fixing the lateral position of the pad before, during and after said bolts fasten the spokes and brackets together via said bracket and said spoke bolt holes.

18. A steering wheel according to claim 16, wherein said supports project from said spokes.

19. A steering wheel according to claim 16, wherein said boss includes a boss plate and said supports project from said boss plate.

20. A steering wheel according to claim 16, wherein each said spokes of said body is provided with a metallic spoke core and each said support is formed integrally with said core.

* * * * *